(12) United States Patent
Chamberlain

(10) Patent No.: US 12,446,858 B2
(45) Date of Patent: Oct. 21, 2025

(54) DISPLAYING VISUAL REPRESENTATIONS OF ULTRASOUND TRANSDUCERS

(71) Applicant: FUJIFILM SONOSITE, INC., Bothell, WA (US)

(72) Inventor: Craig Chamberlain, Bothell, WA (US)

(73) Assignee: FUJIFILM SONOSITE, INC., Bothell, WA (US)

( * ) Notice: Subject to any disclaimer, the term of this patent is extended or adjusted under 35 U.S.C. 154(b) by 25 days.

(21) Appl. No.: 18/216,508

(22) Filed: Jun. 29, 2023

(65) Prior Publication Data

US 2025/0000490 A1   Jan. 2, 2025

(51) Int. Cl.
*A61B 8/00* (2006.01)

(52) U.S. Cl.
CPC ............ *A61B 8/466* (2013.01); *A61B 8/4254* (2013.01); *A61B 8/429* (2013.01)

(58) Field of Classification Search
None
See application file for complete search history.

(56) References Cited

U.S. PATENT DOCUMENTS

| | | | |
|---|---|---|---|
| 2017/0007202 A1* | 1/2017 | Peszynski | A61B 8/54 |
| 2022/0304660 A1* | 9/2022 | Loype | A61B 8/54 |

* cited by examiner

*Primary Examiner* — Amal Aly Farag
(74) *Attorney, Agent, or Firm* — Womble Bond Dickinson (US) LLP

(57) ABSTRACT

Ultrasound systems for displaying visual representations of ultrasound transducers and methods for doing the same are disclosed. In some embodiments, an ultrasound system includes an ultrasound probe including a probe body and a transducer assembly coupled to the probe body. The ultrasound probe is configured to cause a movement of the transducer assembly based on a setting made with the probe body. The ultrasound system also includes a display device that is configured to display a visual representation of the transducer assembly that indicates at least one angle resulting from the movement.

20 Claims, 16 Drawing Sheets

Method 1100

Determine, with one or more sensors of a probe body of an ultrasound probe, a setting of one or more user input devices of the probe body, the ultrasound probe configured to cause a movement of a transducer assembly of the ultrasound probe based on the setting
1102

Display, with a a display device coupled to the ultrasound probe, a visual representation of the transducer assembly that indicates at least one angle resulting from the movement
1104

Method 1100

Determine, with one or more sensors of a probe body of an ultrasound probe, a setting of one or more user input devices of the probe body, the ultrasound probe configured to cause a movement of a transducer assembly of the ultrasound probe based on the setting
1102

Display, with a a display device coupled to the ultrasound probe, a visual representation of the transducer assembly that indicates at least one angle resulting from the movement
1104

FIG. 11

Method 1200

```
Move a transducer assembly of an ultrasound probe while the transducer assembly is
inserted into a body cavity in at least one dimension and generate ultrasound data, the
ultrasound probe including a probe body, the transducer assembly, and a mid-section
that connects the probe body and the transducer assembly, the transducer assembly
     configured for insertion into the body cavity while the probe body remains outside the
                                       body cavity
                                          1202
```

↓

```
     Generate, with a processor system, an ultrasound image based on the ultrasound data
                                          1204
```

↓

```
     Simultaneously display, with a display device, the ultrasound image and a visual
                    representation of the transducer assembly
                             in the at least one dimension
                                          1206
```

FIG. 12

Method 1300

Cause, with an ultrasound probe having a transducer assembly while inserted into a body cavity:

the transducer assembly to move in an anteflexion/retroflexion dimension and a lateral flexion dimension;

a transducer array of the transducer assembly to rotate about a vertical axis that is perpendicular to the transducer array; and the transducer assembly to rotate about a longitudinal axis of transducer assembly
1302

Display, with a display device, one or more visual representations indicating the movements in the anteflexion/retroflexion dimension and the lateral flexion dimension, the rotation about the vertical axis, and the rotation about the longitudinal axis
1304

FIG. 13

DISPLAYING VISUAL REPRESENTATIONS OF ULTRASOUND TRANSDUCERS

FIELD

Embodiments disclosed herein relate to ultrasound systems. More specifically, embodiments disclosed herein relate to ultrasound systems that display visual representations of ultrasound transducers.

BACKGROUND

Ultrasound systems can generate ultrasound images by transmitting sound waves at frequencies above the audible spectrum into a body, receiving echo signals caused by the sound waves reflecting from internal body parts, and converting the echo signals into electrical signals for image generation. Because they are non-invasive and can provide immediate imaging results, ultrasound systems are commonly used in examinations of numerous types of anatomies. In some of these examinations, an ultrasound probe is inserted inside a body cavity (e.g., a transesophageal ultrasound probe). To properly orient the transducer with respect to an anatomy when inserted, the ultrasound probe usually supports some type of mechanical movement of the transducer assembly in the ultrasound probe. For instance, the transducer assembly can be controlled by wires/cables to move the transducer assembly in a retroflexion or anteflexion direction.

To control the movement of the transducer assembly via the wires/cables, the operator usually relies on controls (e.g., knobs) on the body of the ultrasound probe. The position of the transducer assembly when inserted into a patient can therefore be determined by inspection of the controls on the probe body. However, these controls can easily be misinterpreted by the ultrasound operator because the use of the knobs is inherently cumbersome and unintuitive. Consequently, the operator may remove the ultrasound probe from a patient when the transducer assembly is not in a straight position but is instead articulated (or bent). Hence, the removal of the probe can cause significant damage to the patient. Accordingly, the patient may not receive the best care possible when the ultrasound operator uses conventional ultrasound systems.

SUMMARY

Ultrasound systems for displaying visual representations of ultrasound transducers and methods for doing the same are disclosed. In some embodiments, an ultrasound system includes an ultrasound probe including a probe body and a transducer assembly coupled to the probe body. The probe body includes one or more user input devices and one or more sensors configured to determine a setting of the one or more user input devices, and the ultrasound probe is configured to cause a movement of the transducer assembly based on the setting. The ultrasound system also includes a display device coupled to the ultrasound probe and configured to display a visual representation of the transducer assembly that indicates at least one angle resulting from the movement.

In some other embodiments, the ultrasound system includes an ultrasound probe including a probe body, a transducer assembly, and a mid-section that connects the probe body and the transducer assembly. The transducer assembly is configured for insertion into a body cavity while the probe body remains outside the body cavity and is configured to, while inserted into the body cavity, move in at least one dimension, and generate ultrasound data. The ultrasound system also includes a processor system configured to generate an ultrasound image based on the ultrasound data and a display device coupled to the ultrasound probe and configured to simultaneously display the ultrasound image and a visual representation of the transducer assembly in the at least one dimension.

In still some other embodiments, an ultrasound system includes an ultrasound probe including a transducer assembly having a transducer array, where the transducer assembly is configured for insertion into a body cavity. The ultrasound probe is configured to, while the transducer assembly is inserted into the body cavity, cause the transducer assembly to move in an anteflexion/retroflexion dimension and a lateral flexion dimension, cause the transducer array to rotate about a vertical axis that is perpendicular to the transducer array, and cause the transducer assembly to rotate about a longitudinal axis of transducer assembly. The ultrasound system also includes a display device configured to display one or more visual representations indicating the movements in the anteflexion/retroflexion dimension and the lateral flexion dimension, the rotation about the vertical axis, and the rotation about the longitudinal axis.

Other systems, machines, and methods for displaying visual representations of ultrasound transducers are also described.

BRIEF DESCRIPTION OF THE DRAWINGS

The appended drawings illustrate examples and are, therefore, exemplary embodiments and not considered to be limiting in scope.

FIG. 11 illustrates a method performed by some embodiments of an ultrasound system.

FIG. 12 illustrates a method performed by some embodiments of an ultrasound system.

FIG. 13 illustrates a method performed by some embodiments of an ultrasound system.

DETAILED DESCRIPTION

In the following description, numerous details are set forth to provide a more thorough explanation of the embodiments described herein. It will be apparent, however, to one skilled in the art, that the embodiments may be practiced without these specific details. In other instances, well-known structures and devices are shown in block diagram form, rather than in detail, in order to avoid obscuring the techniques disclosed herein.

Use of conventional ultrasound systems when internally inserted into a patient can cause harm to the patient when the ultrasound probe is removed because an operator can misinterpret the position of the transducer assembly during probe removal. Accordingly, systems, devices, and techniques are disclosed herein for indicating orientations of probe heads (e.g., transducer assemblies), such as with visual representations of the transducer assembly displayed on a display device of the ultrasound system. In some embodiments, a probe body of an ultrasound probe includes sensors to determine the settings of user controls (e.g., knobs, buttons, sliders, etc.) on the probe body that control the movement of a transducer assembly of the ultrasound probe. The ultrasound system can generate a visual representation (e.g., graphic) of the transducer assembly that unambiguously illustrates the position of the transducer head. In some embodiments, the graphic is a three-dimensional (3D) graphic that illustrates the probe head (e.g., transducer assembly) orientation in retroflexion/anteflexion and lateral flexion dimensions. Additionally or alternatively, the visual representation can include numeric values of one or more angles of the transducer assembly. Additionally or alternatively, the visual representation can depict an orientation of the transducer assembly with respect to a longitudinal axis. Additionally or alternatively, the visual representation can depict an orientation of a transducer array of the transducer assembly with respect to a vertical axis that is normal to the transducer array. Accordingly, the visual representation can depict an orientation of the transducer assembly in up to four degrees of freedom, e.g., (i) anteflexion/retroflexion, (ii) lateral flexion, (iii) rotation about a longitudinal axis, and (iv) rotation of the array about a vertical axis.

Figure 1A:
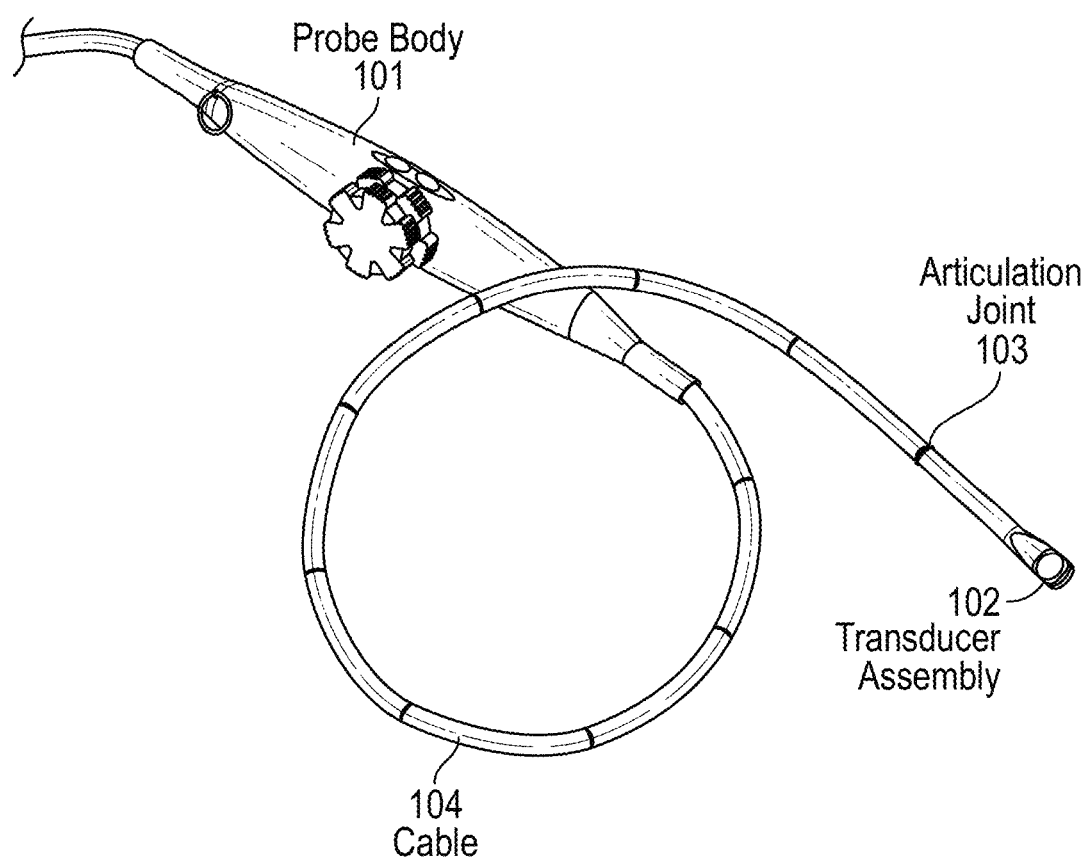
FIGS. 1A and 1B illustrate some embodiments of ultrasound probes that can be inserted into a body cavity.
Figure 1B:
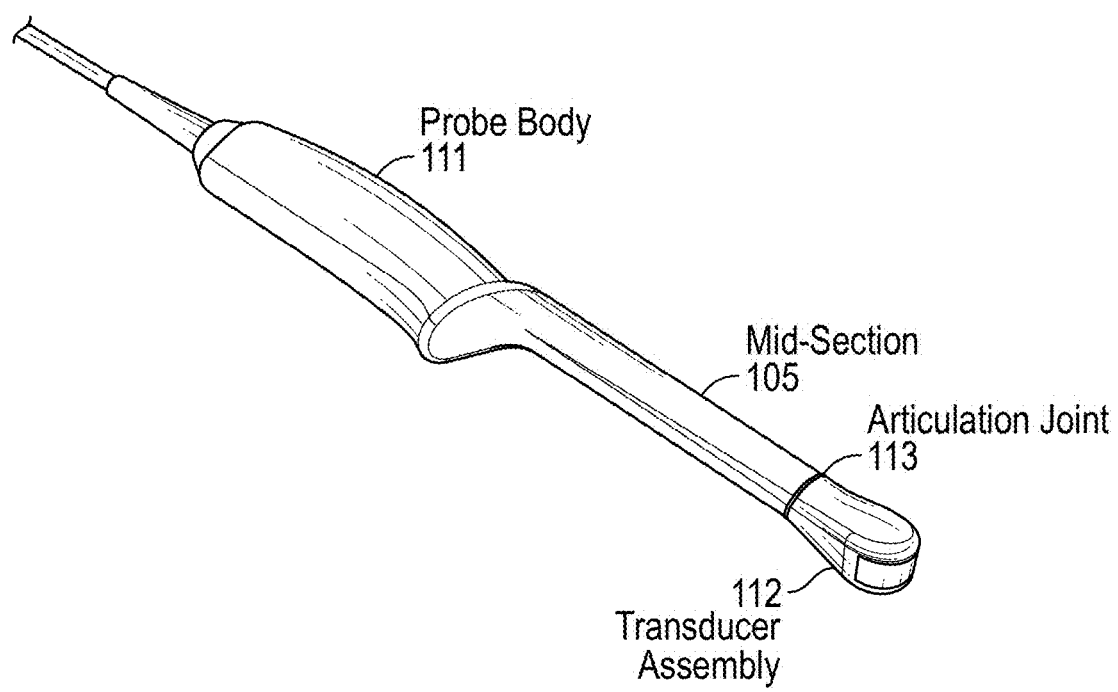

FIGS. 1A and 1B illustrate some embodiments of ultrasound probes that can be inserted into a body cavity, e.g., esophagus, rectum, etc. Referring to FIG. 1A, in some embodiments, the ultrasound probe includes a probe body 101 and a transducer assembly 102 that can articulate, e.g., move in one or more directions, such as about an articulation joint 103 that can act like a knuckle. Probe body 101 is connected to transducer assembly 102 via a mid-section. In FIG. 1A, the mid-section includes a cable 104. Referring to FIG. 1B, in some embodiments, the ultrasound probe includes a probe body 111 and a transducer assembly 112 that can articulate, e.g., move in one or more directions, such as about an articulation joint 113 that can act like a knuckle. Probe body 111 is connected to transducer assembly 112 via a mid-section 105, which is more rigid than cable 104 in FIG. 1A.

Figure 2:
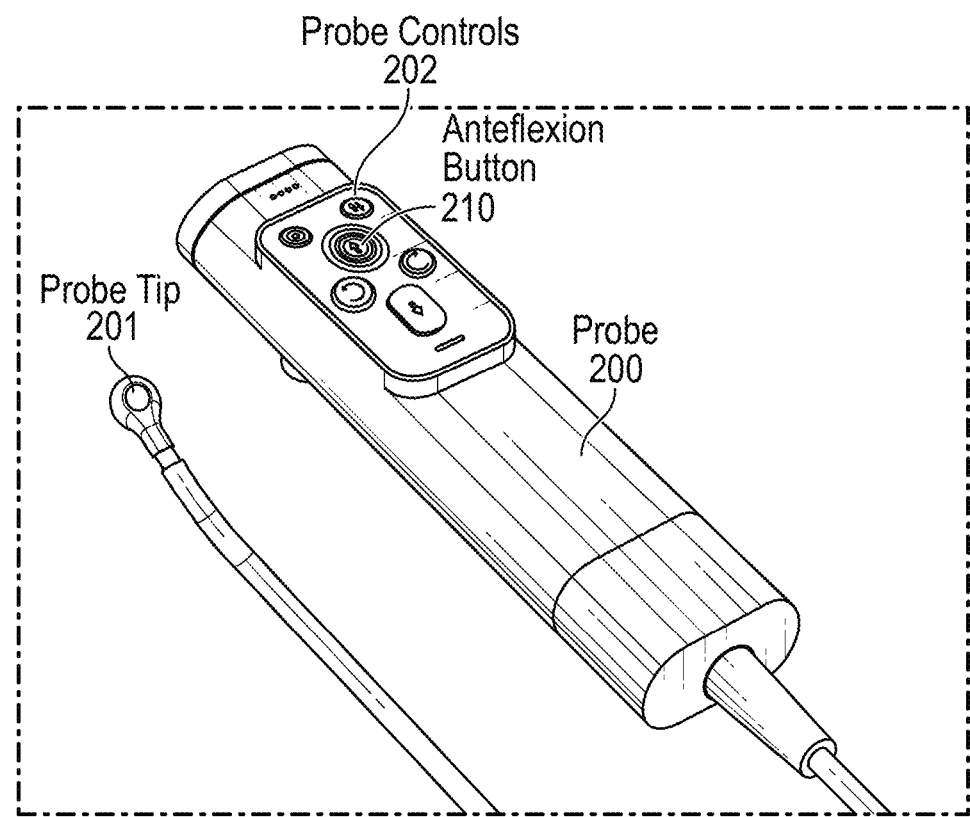
FIG. 2 depicts movement of some embodiments of a transducer assembly in an anteflexion direction resulting from the activation of a button on the probe body.

FIG. 2 depicts movement of some embodiments of a transducer assembly in an anteflexion direction resulting from the activation of a button on the probe body. Referring to FIG. 2, probe 200 includes probe tip 201 which is controlled by a user using probe controls 202 on the body of probe 200. Probe tip 201 includes a transducer assembly with one or more transducers. In some embodiments, probe controls 202 include an anteflexion button 210 that can be used to control probe tip 201 into and out of an anteflexion position. As shown in FIG. 2, probe tip 201 is currently moved into an anteflexion direction.

Figure 3:
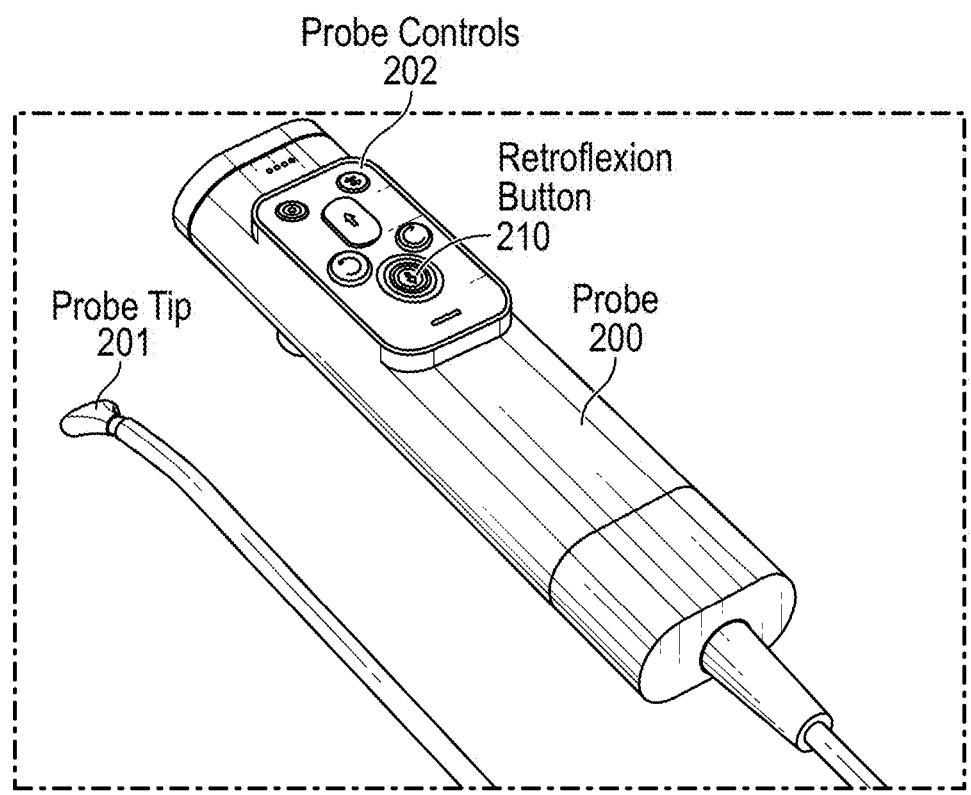
FIG. 3 depicts movement of some embodiments of a transducer assembly in a retroflexion direction (e.g., opposite to the anteflexion direction) resulting from the activation of a button on the probe body.

FIG. 3 depicts movement of some embodiments of a transducer assembly in a retroflexion direction (e.g., opposite to the anteflexion direction illustrated in FIG. 2) resulting from the activation of a button on the probe body. Referring to FIG. 3, probe 200 includes probe tip 201 which is controlled by a user using probe controls 202 on the body of probe 200. Probe tip 201 includes a transducer assembly with one or more transducers. In some embodiments, probe controls 202 include a retroflexion button 211 that can be used to control probe tip 201 into and out of a retroflexion position. As shown in FIG. 3, probe tip 201 is currently moved into a retroflexion direction.

Figure 4C:
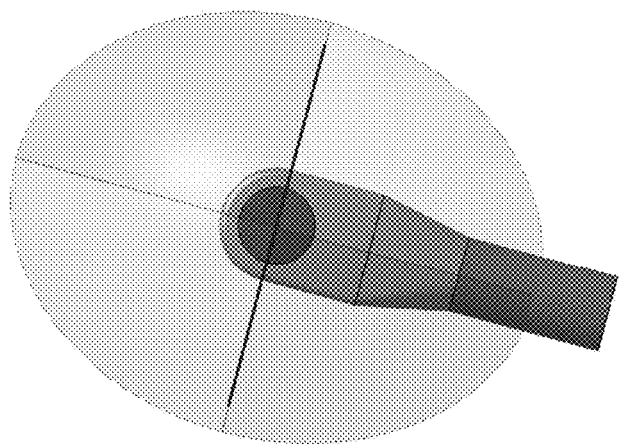
FIGS. 4A-4C depict movement of some embodiments of a transducer assembly in left and right transverse and straight directions, respectively, resulting from activation of buttons on a probe body.
Figure 4B:
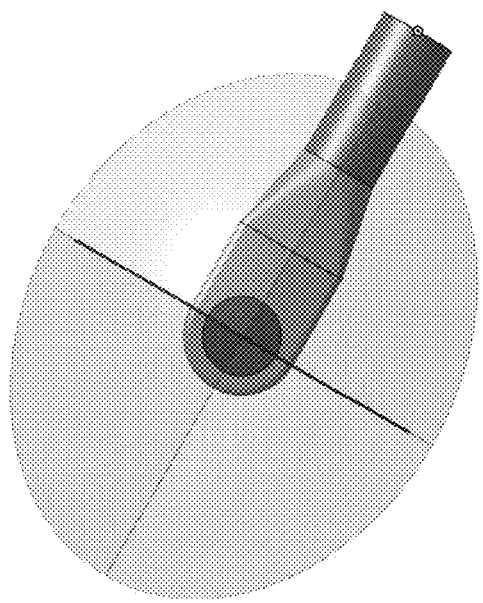
Figure 4A:
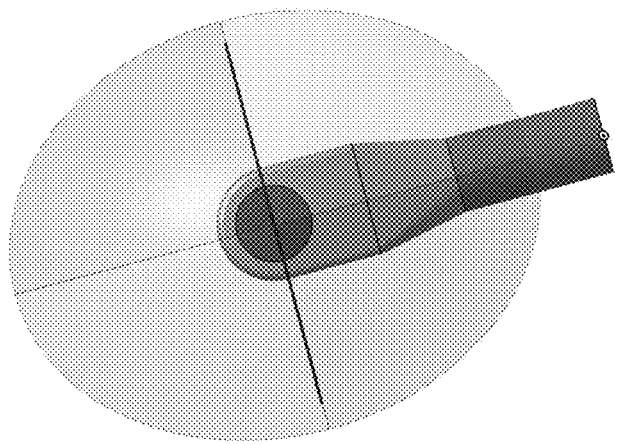

A lateral flexion dimension (e.g., plane) is perpendicular to the dimension of the anteflexion/retroflexion movement. For instance, the anteflexion/retroflexion movement corresponds to up/down movement and transverse flexion movement corresponds to left/right movement of the transducer assembly. FIGS. 4A-4C depict movement of a transducer assembly in transverse left, transverse right, and straight directions, respectively, resulting from the activation of buttons on the probe body.

Figure 5C:
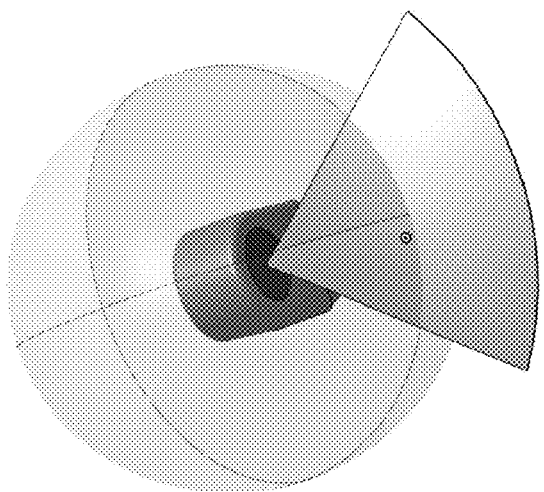
FIGS. 5A-5F depict movements of some embodiments of a transducer assembly in other directions.
Figure 5B:
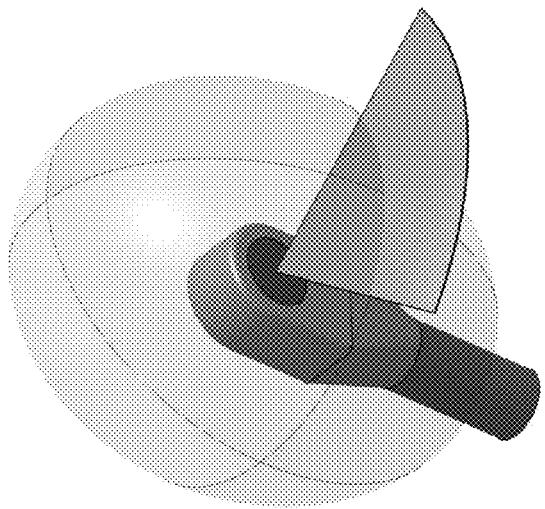
Figure 5A:
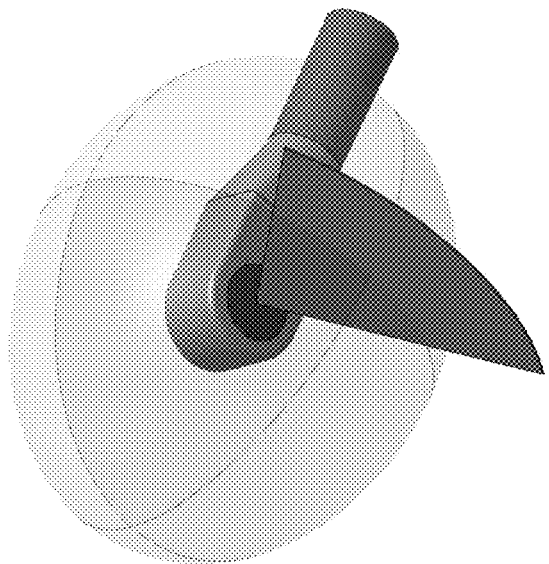
Figure 5F:
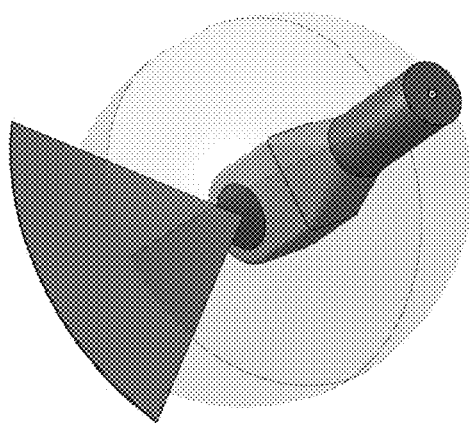
Figure 5E:
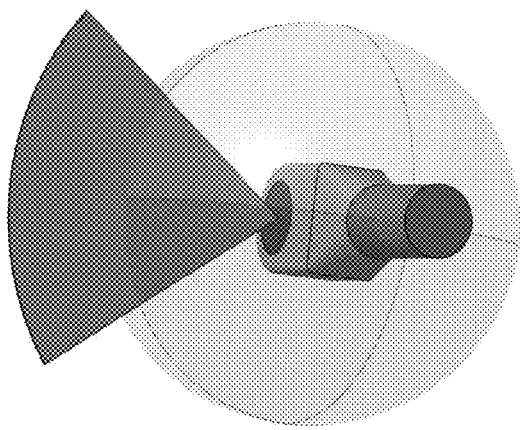
Figure 5D:
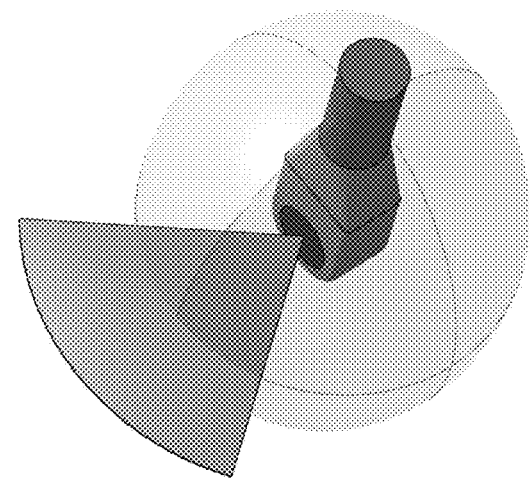

FIGS. 5A-5F depict movements of a transducer assembly in other directions. For example, FIG. 5A depicts movement of a transducer assembly in the anteflexion traverse left direction. FIG. 5B depicts movement of a transducer assembly in the anteflexion traverse right direction. FIG. 5C depicts movement of a transducer assembly in the anteflexion direction. FIG. 5D depicts movement of a transducer assembly in the retroflexion traverse left direction. FIG. 5E depicts movement of a transducer assembly in the retroflexion traverse right direction. FIG. 5F depicts movement of a transducer assembly in the retroflexion direction.

In the examples in FIGS. 2-5, the probe body of some embodiments of an ultrasound probe includes buttons to move the transducer assembly. The buttons can be mechanical or electrical. In an example, the buttons are included in a touchscreen on the probe body. The probe body can include one or more sensors to determine the settings of the buttons. For instance, the sensors can be electrical and determine a voltage or current value, or index value in a register or look up table to determine the settings of the buttons. Additionally or alternatively, the probe body can include control devices other than a button that can be activated on the probe to move the transducer assembly, including, but not limited to, a slider, toggle, dip switch, etc. Additionally or alternatively, the probe body can include mechanical knobs as input devices to adjust an orientation of a transducer assembly.

Figure 6:
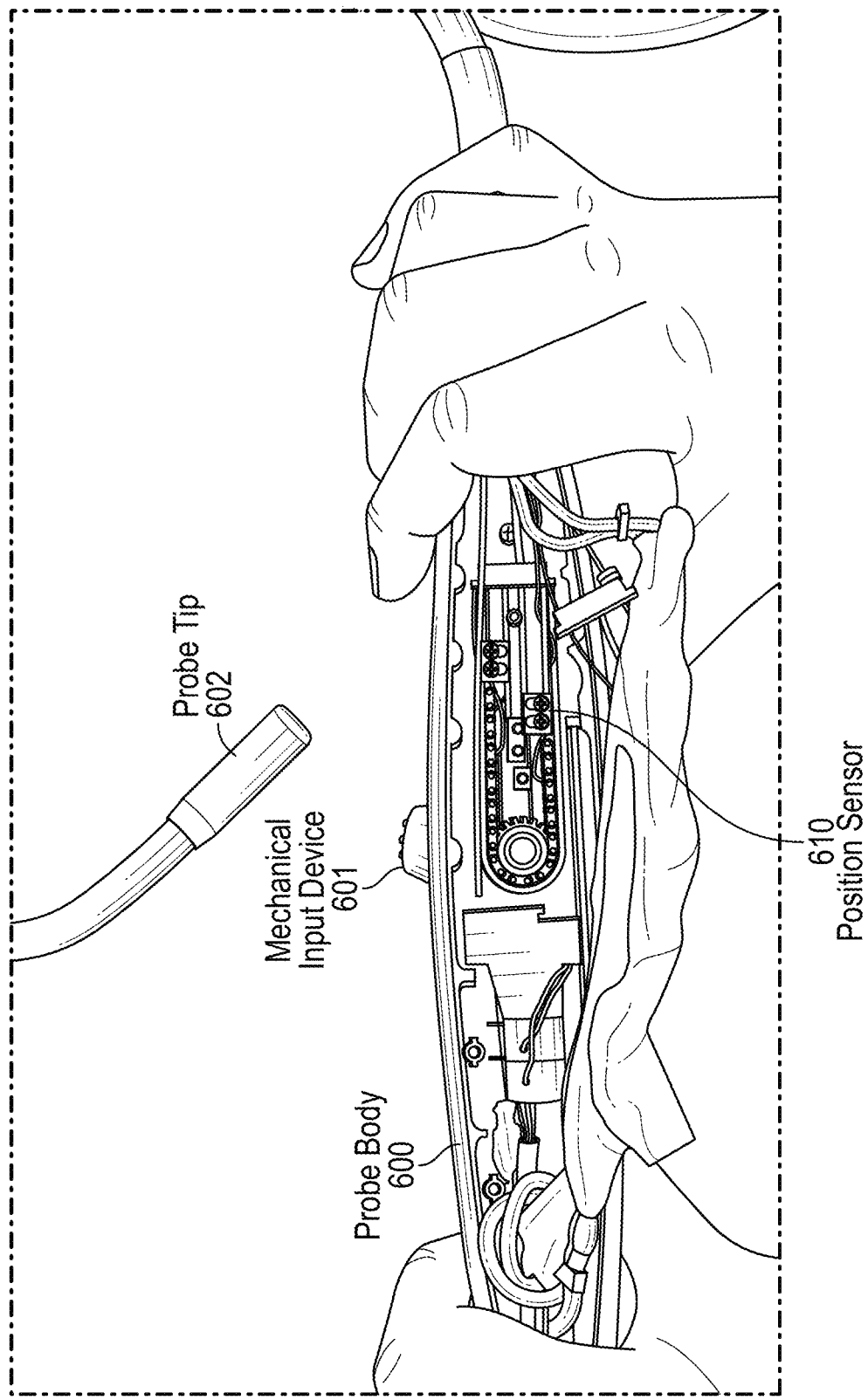
FIG. 6 illustrates anteflexion movement of some embodiments of a transducer assembly caused by mechanical knob adjustment on a probe body.

For example, FIG. 6 illustrates anteflexion movement of a transducer assembly caused by mechanical knob adjustment on the probe body. Referring to FIG. 6, the probe body 600 includes a mechanical input device 601, such as a knob or thumbwheel, that a user can adjust with their thumb. As the user adjusts mechanical input device 601, such as by turning the knob/thumbwheel, the internal chain of the probe body is moved around a sprocket, which pulls a cable in the probe's mid-section to move the transducer assembly. A position sensor 610 (e.g., inside the white ellipse of FIG. 6)

determines the position of the chain, and thus the position (e.g., angle) of the transducer assembly in the probe tip 602 in the anteflexion/retroflexion dimension.

Figure 7:
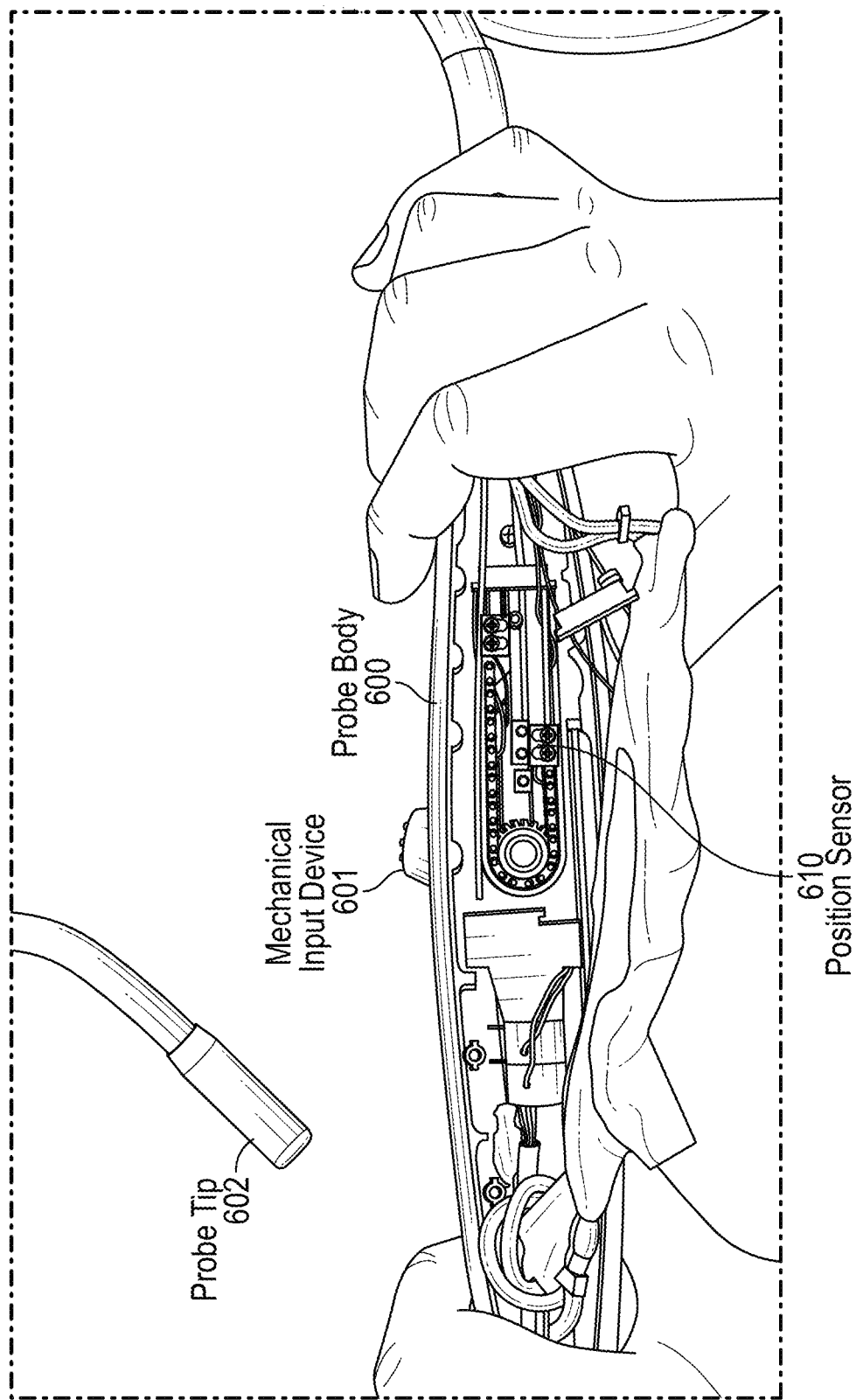
FIG. 7 illustrates retroflexion movement of some embodiments of a transducer assembly caused by a mechanical knob adjustment on a probe body in the opposite direction of the example illustrated in FIG. 6.

FIG. 7 illustrates retroflexion movement of some embodiments of a transducer assembly caused by mechanical knob adjustment on the probe body in the opposite direction of the example illustrated in FIG. 6. Referring to FIG. 7, probe body 600 includes mechanical input device 601 (e.g., a knob or thumbwheel) that a user can adjust with their thumb (e.g., turning the knob/thumbwheel), causing the internal chain of the probe body to be moved around a sprocket, which pulls a cable in the probe's mid-section to move the transducer assembly. Notice that the sensor position has moved to the left in FIG. 7 compared to FIG. 6. Position sensor 610 can therefore determine, by linear movement of the end of the chain, an angular displacement of the transducer assembly in the probe tip 602 in the anteflexion/retroflexion dimension.

In some embodiments, the probe body includes any suitable sensor to determine a setting of an input device on the probe body, and the ultrasound system determines, from the setting, an orientation of the transducer assembly including anteflexion/retroflexion angles, lateral flexion angles, rotation angles about a longitudinal axis, and rotation angles of the transducer array about a vertical axis. In some embodiments, the probe body includes one or more sensors such as, for example, but not limited to, at least one of a Hall effect sensor, a resistive sensor, a capacitive sensor, a rotary sensor, and a linear sensor. For instance, a linear sensor is included in the examples illustrated in FIGS. 6 and 7. Additionally or alternatively, a rotary sensor can be used on the shaft of a knob or thumbwheel to determine the setting of the knob/thumbwheel.

Figure 8:
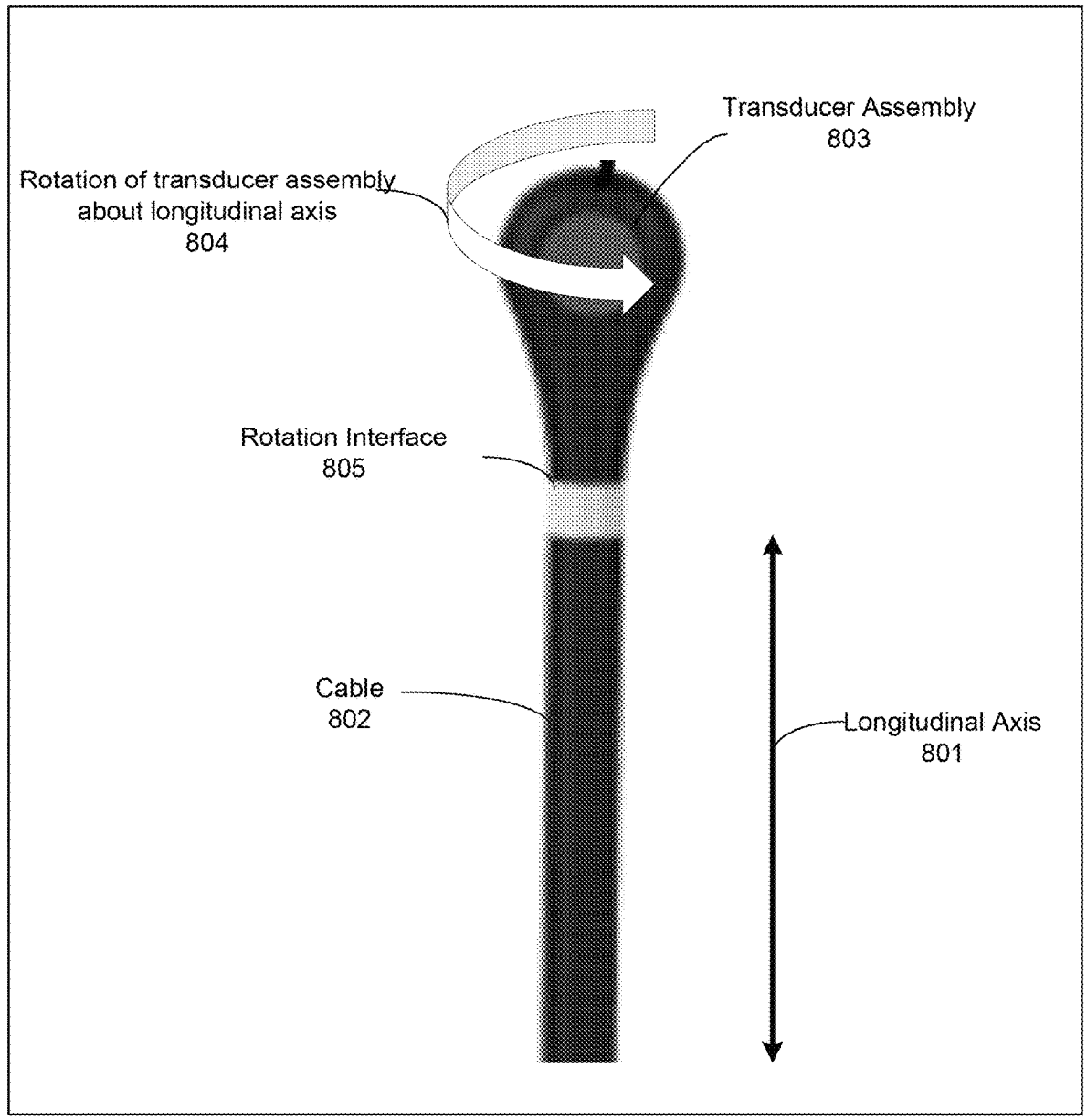
FIG. 8 illustrates rotation of some embodiments of a transducer assembly about a longitudinal axis.
Figure 9:
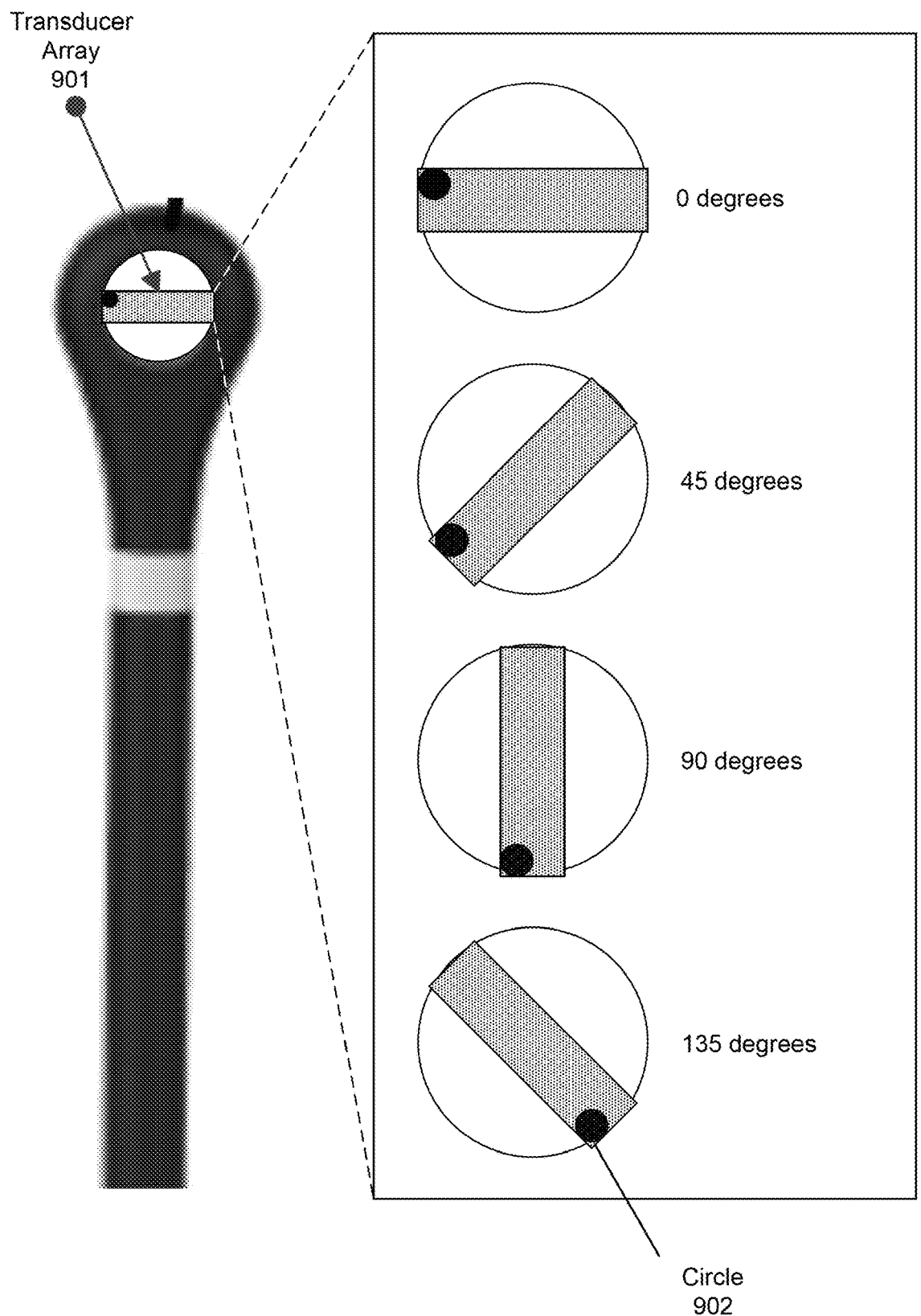
FIG. 9 depicts four rotation angles of some embodiments of a transducer array about a vertical axis, 0 degrees, 45 degrees, 90 degrees, and 135 degrees.

FIG. 8 illustrates rotation of some embodiments of a transducer assembly about a longitudinal axis. For instance, the longitudinal axis 801 runs the length of a transducer assembly 803 parallel to the mid-section, e.g., the cable 802 when straightened. On the transducer side of the rotation interface 805, transducer assembly 803 can rotate, e.g., 360 degrees to point the transducer array of transducer assembly 803 at a particular anatomy. In some embodiments, the rotation 804 of transducer assembly 803 is about longitudinal axis 801. In some embodiments, rotation of the transducer assembly 803 is performed by a motor that is activated by a button or other control on the probe. For example, by pressing and holding down a button on the probe, the motor causes rotation of transducer assembly 803 until the button is released FIG. 9 illustrates rotation of some embodiments of a transducer array of the transducer assembly along a vertical axis that is perpendicular to the transducer array. Referring to FIG. 9, the transducer array 901 of transducer assembly is illustrated as the rectangular box, and the vertical axis is normal to the drawing, e.g., going through the center of transducer array 901 and out of the paper. Transducer array 901 includes a solid circle 902 as a reference point to illustrate the rotation of transducer array 901. FIG. 9 depicts four rotation angles of transducer array 901 about the vertical axis, 0 degrees, 45 degrees, 90 degrees, and 135 degrees. These values of the angle are examples, and generally transducer array 901 can be rotated in a continuous fashion to any angle within 360 degrees of rotation. In some embodiments, rotation of the transducer array is performed by a motor that is activated by a button or other control on the probe. For example, by pressing and holding down a button on the probe, the motor causes rotation of the transducer array until the button is released.

Figure 10:
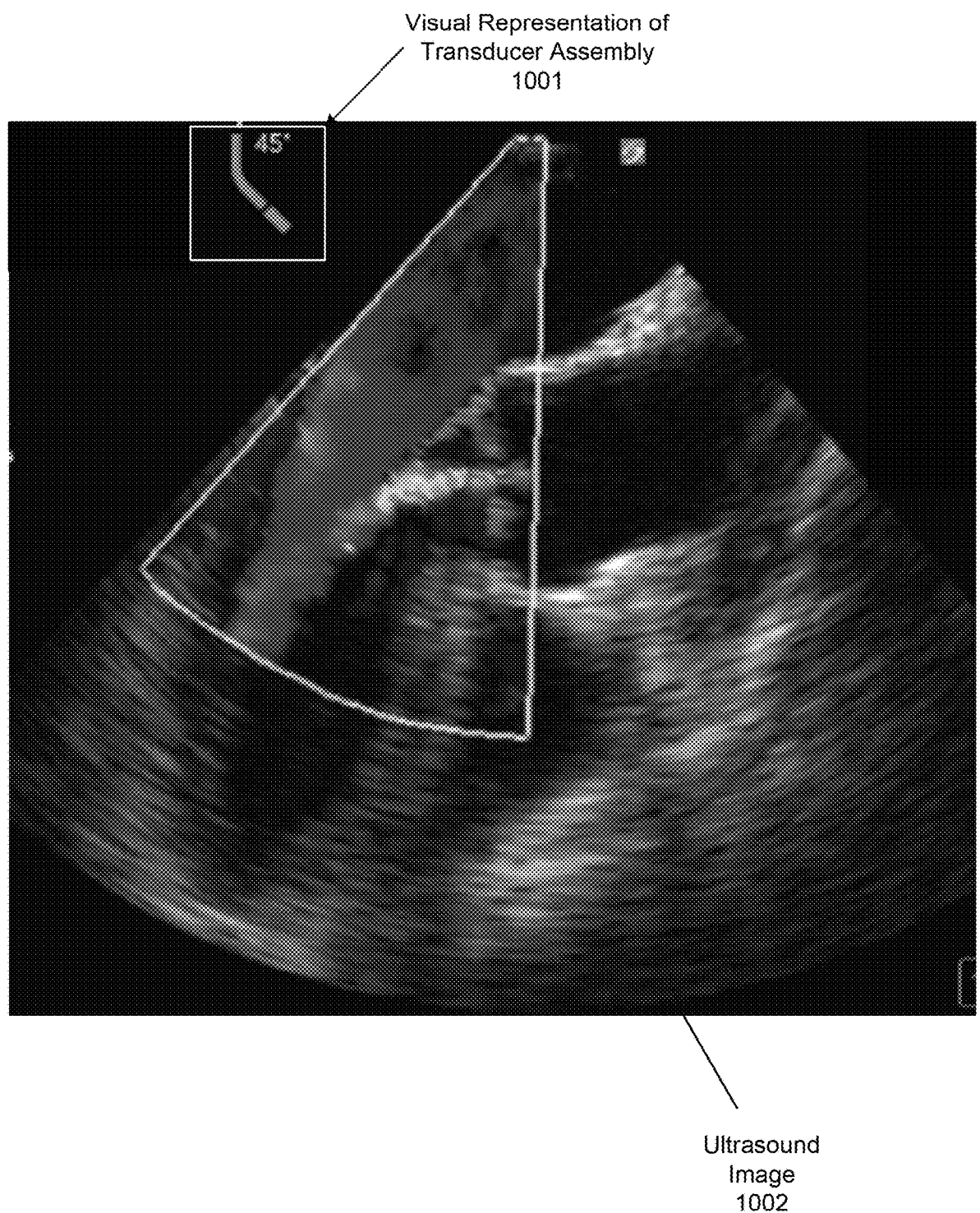
FIG. 10 illustrates some embodiments of a user interface with a visual representation of probe tip/transducer array.

FIG. 10 illustrates a user interface of some embodiments of an ultrasound system. Referring to FIG. 10, the user interface displays a visual representation 1001 of a probe tip and transducer array in an anteflexion/retroflexion dimension. In some embodiments, visual representation 1001 includes a graphic that depicts the transducer array with a bent probe tip at 45 degrees, as well as numerically indicates the angle with the number "45". In some embodiments, the ultrasound system displays visual representation 1001 simultaneously with an ultrasound image 1002, live during an ultrasound examination. Note that visual representation 1001 does not have to resemble a probe tip. For example, visual representation 1001 can comprise a visual representation that provides an indication (e.g., a thumbs up/thumbs down indication) to the user that it is safe to remove the probe from within the body (e.g., remove the transducer assembly from the body, etc.). Alternatively or additionally, the indication can comprise an audio indication that indicates to a user that it is safe/unsafe to remove the probe from within the body.

In some other embodiments, the visual representations of the probe tip that are displayed with the ultrasound image 1002 are three-dimensional (3D) graphics. For example, in some embodiments, the visual representations of the probe tip that are displayed on the display of the ultrasound machine are any one of the images shown in FIGS. 4A-4C and FIGS. 5A-5F.

FIG. 11 illustrates a method 1100 performed by some embodiments of an ultrasound system. In some embodiments, the ultrasound system includes an ultrasound probe and a display device. Referring to FIG. 11, an ultrasound probe includes a probe body and a transducer assembly coupled to the probe body, and the probe body includes one or more user input devices and one or more sensors that determine a setting of the one or more user input devices (block 1102). In some embodiments, the ultrasound probe is configured to cause a movement of the transducer assembly based on the setting.

A display device is coupled to the ultrasound probe and displays a visual representation of the transducer assembly that indicates at least one angle resulting from the movement (block 1104). In some embodiments, the at least one angle includes one of an anteflexion/retroflexion angle and a lateral flexion angle. Additionally, the at least one angle can include the other of the anteflexion/retroflexion angle and the lateral flexion angle. In some embodiments, the visual representation includes a three-dimensional (3D) graphic. For instance, the visual representation can include a graphic of a tip of the ultrasound probe that includes the transducer array and display the graphic in a volume defined by an anteflexion/retroflexion dimension that is perpendicular to a lateral flexion dimension, such as shown, for example, but not limited to, the images shown in FIGS. 4A-4C and FIGS. 5A-5F. In some embodiments, the graphic indicates the anteflexion/retroflexion angle and the lateral flexion angle by the orientation of the tip of the ultrasound probe that includes the transducer array. For instance, the orientation of the tip can be superimposed over one or more axes that define an anteflexion/retroflexion dimension and/or a lateral flexion dimension. Additionally or alternatively, the visual representation can include a number to indicate at least one of the anteflexion/retroflexion angle and the lateral flexion angle.

In some embodiments, the ultrasound system includes a cable implemented to couple the ultrasound probe and the display device. The at least one angle can include an angle of rotation of the transducer assembly about a longitudinal axis of the cable. The longitudinal axis of the cable can be determined when the cable is straightened. Additionally or alternatively, the transducer assembly can include a transducer array, and the at least one angle can include an angle of rotation of the transducer array about a vertical axis that is perpendicular to the transducer array, as previously described.

In some embodiments, the one or more sensors include at least one of a Hall effect sensor, a resistive sensor, a capacitive sensor, a rotary sensor, and a linear sensor. Additionally or alternatively, the one or more user input devices can include at least one of a knob, a button, a wheel, a stick, and a slider.

In some embodiments, the ultrasound system includes a processor implemented to determine an amount of tissue compression based on ultrasound transmitted by the transducer assembly when the transducer assembly is inserted inside a body cavity. For instance, the processor can include a processor system that implements a neural network trained to determine an amount of tissue compression based on ultrasound data, such as one or more ultrasound images. The ultrasound system can issue a warning against moving the ultrasound probe based on the amount of tissue compression, to prevent harm to the patient caused by movement of the transducer assembly when it is bent and compressing against the patient's tissue. The warning can include haptic feedback on the ultrasound probe, such as by causing the probe body to vibrate. Additionally or alternatively, the display device can display a warning indicator, such as, for example, but not limited to, a graphic "stop sign" or to spell "W-A-R-N-I-N-G". Another example of the warning indicator includes to change a color of the visual representation of the transducer assembly that indicates the at least one angle resulting from the movement, such as by changing its color to red and/or including a circle around the visual representation with a diagonal line going through the center of the circle and through the visual representation.

In some embodiments, at least one of the ultrasound probe and the display device includes a control input that when enabled prevents the movement of the transducer assembly. For instance, the control input can include a "lock" button. The display device can change the display of the visual representation responsive to the control input being enabled, such as by including or overlaying a lock icon (e.g., in the shape of a padlock).

In some embodiments, at least one of the ultrasound probe and the display device includes a control input that when enabled resets the transducer assembly to a default position. The default position can orient the probe tip to a non-bent position, so that the transducer assembly is co-linear with the cable connecting the transducer assembly and the probe body. In some embodiments, the default position includes to reset the at least one angle, e.g., the anteflexion/retroflexion angle and/or the lateral flexion angle, or any other suitable angle, to zero. When reset to this default position, the transducer assembly is safe to be inserted into, or removed from, a patient cavity. The display device can change the display of the visual representation responsive to the control input being enabled to reset the transducer assembly, such as by including or overlaying an icon (e.g., a "thumbs up" or a speeding vehicle), or changing the color of the visual representation, e.g., to green.

FIG. 12 illustrates a method 1200 performed by some embodiments of an ultrasound system in accordance with the present invention. In some embodiments, the ultrasound system includes an ultrasound probe, a processor system, and a display device. Referring to FIG. 12, an ultrasound probe includes a probe body, a transducer assembly, and a mid-section that connects the probe body and the transducer assembly (block 1202). Cable 104 in FIG. 1A and mid-section 105 in FIG. 1B are examples of the mid-section that connects the probe body and the transducer assembly. In some embodiments, the transducer assembly is configured for insertion into a body cavity while the probe body remains outside the body cavity. In some embodiments, the transducer assembly, while inserted into the body cavity, moves in at least one dimension, and generates ultrasound data.

A processor system generates an ultrasound image based on the ultrasound data (block 1204). A display device is coupled to the ultrasound probe and simultaneously displays the ultrasound image and a visual representation of the transducer assembly in the at least one dimension (block 1206). The at least one dimension can include an anteflexion/retroflexion dimension and a lateral flexion dimension, and the visual representation can include a three-dimensional (3D) graphic.

Additionally or alternatively, in some embodiments, the transducer assembly includes a transducer array that rotates about a vertical axis that is perpendicular to the transducer array, and the display device can indicate an angle of the transducer array caused by the rotation. Additionally or alternatively, in some embodiments, the movement of the transducer assembly includes a rotation in a dimension that is perpendicular to a longitudinal axis of the mid-section.

In some embodiments, the ultrasound probe enables a lock state to inhibit the movement of the transducer assembly. The display device can display an indication that the lock state is enabled. For instance, the display device can display a padlock icon. The padlock icon can be superimposed on the visual representation of the transducer assembly.

FIG. 13 illustrates a method 1300 performed by some embodiments of an ultrasound system. In some embodiments, the ultrasound system includes an ultrasound probe and a display device. Referring to FIG. 13, an ultrasound probe includes a transducer assembly having a transducer array, and the transducer assembly is configured for insertion into a body cavity (block 1302). In some embodiments, the ultrasound probe, while the transducer assembly is inserted into the body cavity, causes the transducer assembly to move in an anteflexion/retroflexion dimension and a lateral flexion dimension; causes the transducer array to rotate about a vertical axis that is perpendicular to the transducer array; and causes the transducer assembly to rotate about a longitudinal axis of transducer assembly. A display device displays one or more visual representations indicating the movements in the anteflexion/retroflexion dimension and the lateral flexion dimension, the rotation about the vertical axis, and the rotation about the longitudinal axis (block 1304).

Figure 14:
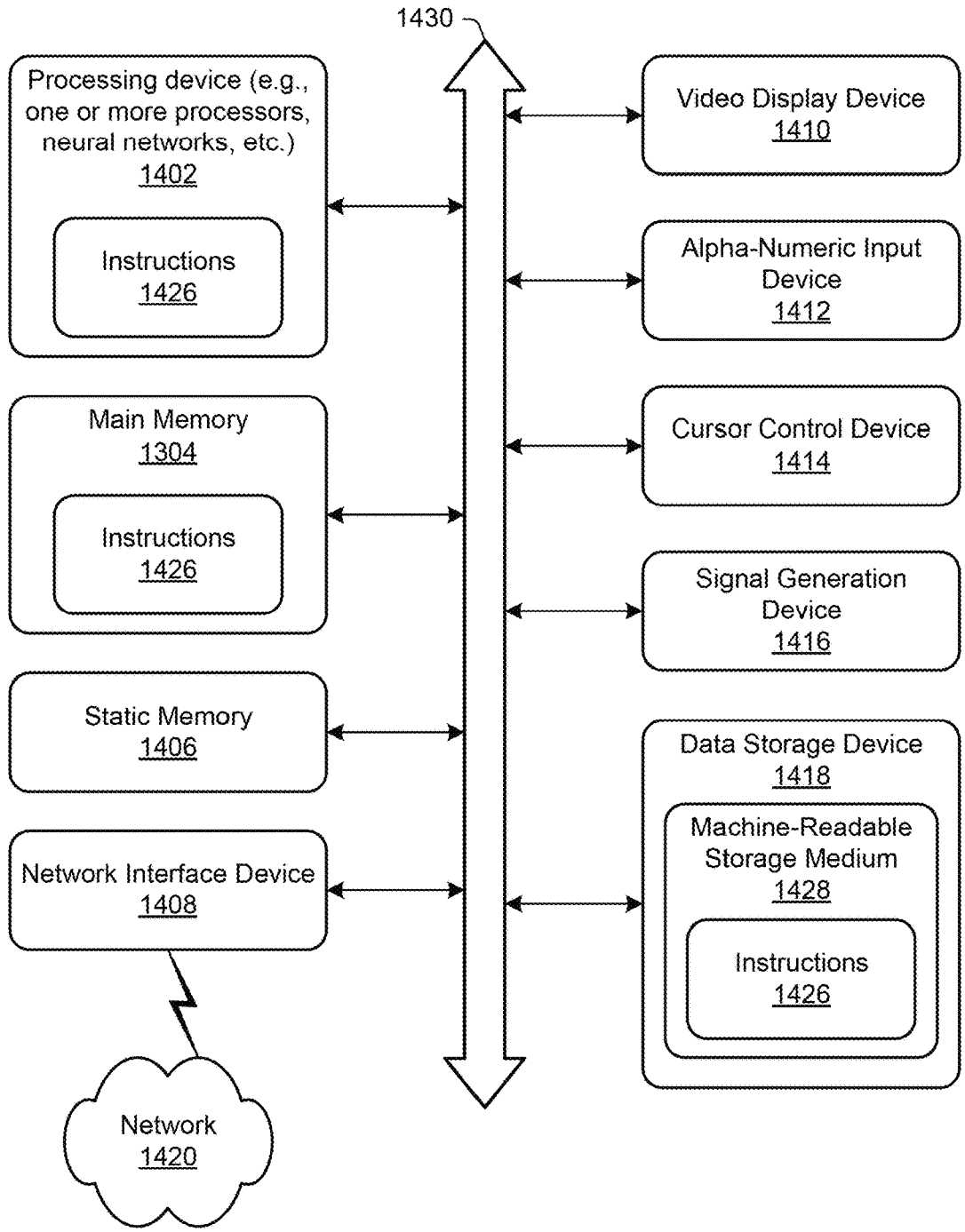
FIG. 14 illustrates a block diagram of an example computing device that can perform one or more of the operations described herein, in accordance with some embodiments.

FIG. 14 illustrates a block diagram of an example computing device 1400 that can perform one or more of the operations described herein, in accordance with some embodiments. Referring to FIG. 14, computing device 1400 can be connected to other computing devices in a LAN, an intranet, an extranet, and/or the Internet. The computing device can operate in the capacity of a server machine in client-server network environment or in the capacity of a client in a peer-to-peer network environment. The computing device 1400 can be provided by a personal computer (PC), a server computing, a desktop computer, a laptop computer, a tablet computer, a smartphone, or any machine capable of executing a set of instructions (sequential or otherwise) that specify actions to be taken by that machine.

Further, while only a single computing device is illustrated, the term "computing device" shall also be taken to include any collection of computing devices that individually or jointly execute a set (or multiple sets) of instructions to perform the methods and processes discussed herein. In some embodiments, the computing device 1400 can be one or more of an access point and a packet forwarding component.

The example computing device 1400 can include a processing device (e.g., a general-purpose processor, a PLD, etc.) 1402, a main memory 1404 (e.g., synchronous dynamic random-access memory (DRAM), read-only memory (ROM)), a static memory 1406 (e.g., flash memory and a data storage device 1418), which can communicate with each other via a bus 1430. Processing device 1402 can be provided by one or more general-purpose processing devices such as one or more microprocessors, central processing units, or the like. In an illustrative example, processing device 1402 can comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1402 can also comprise one or more special-purpose processing devices such as an application specific integrated circuit (ASIC), a field programmable gate array (FPGA), a digital signal processor (DSP), network processor, or the like. In some embodiments, processing device 1402 includes one or more neural networks (e.g., machine learning neural networks, deep learning neural networks, etc.). The processing device 1402 can be configured to execute the operations described herein, in accordance with one or more aspects of the present disclosure, for performing the operations and steps discussed herein.

Computing device 1400 can further include a network interface device 1408 which may communicate with a network 1420. The computing device 1400 also can include a video display unit 1410 (e.g., a liquid crystal display (LCD) or a cathode ray tube (CRT)), an alphanumeric input device 1412 (e.g., a keyboard), a cursor control device 1414 (e.g., a mouse) and an acoustic signal generation device 1416 (e.g., a speaker, and/or a microphone). In an example, the alphanumeric input device 1412 includes a microphone to accept touchless input, e.g., spoken commands. In one embodiment, video display unit 1410, alphanumeric input device 1412, and cursor control device 1414 may be combined into a single component or device (e.g., an LCD touch screen).

Data storage device 1418 can include a computer-readable storage medium 1428 on which may be stored one or more sets of instructions 1426, e.g., instructions for carrying out the operations described herein, in accordance with one or more aspects of the present disclosure. For instance, the instructions 1426 can implement the operations described herein. Instructions 1426 can also reside, completely or at least partially, within main memory 1404 and/or within processing device 1402 during execution thereof by computing device 1400, main memory 1404 and processing device 1402 also constituting computer-readable media. The instructions can further be transmitted or received over a network 1420 via network interface device 1408.

While computer-readable storage medium 1428 is shown in an illustrative example to be a single medium, the term "computer-readable storage medium" should be taken to include a single medium or multiple media (e.g., a centralized or distributed database and/or associated caches and servers) that store the one or more sets of instructions. In some embodiments, the computer-readable storage medium 1428 implements the operations described above. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

There are a number of example embodiments described herein.

Example 1 is an ultrasound system comprising: an ultrasound probe including a probe body and a transducer assembly coupled to the probe body, where the probe body includes one or more user input devices and one or more sensors configured to determine a setting of the one or more user input devices, and the ultrasound probe is configured to cause a movement of the transducer assembly based on the setting. The ultrasound system also includes a display device coupled to the ultrasound probe and configured to display a visual representation of the transducer assembly that indicates at least one angle resulting from the movement.

Example 2 is the ultrasound system of example 1 that may optionally include that the at least one angle includes one of an anteflexion/retroflexion angle and a lateral flexion angle.

Example 3 is the ultrasound system of example 2 that may optionally include that the at least one angle includes the other of the anteflexion/retroflexion angle and the lateral flexion angle.

Example 4 is the ultrasound system of example 3 that may optionally include that the visual representation includes a three-dimensional (3D) graphic.

Example 5 is the ultrasound system of example 1 that may optionally include a cable implemented to couple the ultrasound probe and the display device, wherein the at least one angle includes an angle of rotation of the transducer assembly about a longitudinal axis of the cable.

Example 6 is the ultrasound system of example 1 that may optionally include that the transducer assembly includes a transducer array, and the at least one angle includes an angle of rotation of the transducer array about a vertical axis that is perpendicular to the transducer array.

Example 7 is the ultrasound system of example 1 that may optionally include that the visual representation includes a number to indicate an angle of the at least one angle.

Example 8 is the ultrasound system of example 1 that may optionally include that the one or more sensors include at least one of a Hall effect sensor, a resistive sensor, a capacitive sensor, a rotary sensor, and a linear sensor.

Example 9 is the ultrasound system of example 1 that may optionally include that the one or more user input devices include at least one of a knob, a button, a wheel, a stick, and a slider.

Example 10 is the ultrasound system of example 1 that may optionally include a processor implemented to determine an amount of tissue compression based on ultrasound transmitted by the transducer assembly when the transducer assembly is inserted inside a body cavity, wherein the ultrasound system is implemented to issue a warning against moving the ultrasound probe based on the amount of tissue compression.

Example 11 is the ultrasound system of example 10 that may optionally include that the warning includes at least one of a haptic feedback on the ultrasound probe and a display of a warning indicator on the display device.

Example 12 is the ultrasound system of example 1 that may optionally include that at least one of the ultrasound probe and the display device includes a control input that when enabled prevents the movement of the transducer assembly.

Example 13 is the ultrasound system of example 12 that may optionally include that the display device is implemented to change the display of the visual representation responsive to the control input being enabled.

Example 14 is an ultrasound system comprising: an ultrasound probe including a probe body, a transducer assembly, and a mid-section that connects the probe body and the transducer assembly, where the transducer assembly is configured for insertion into a body cavity while the probe body remains outside the body cavity, and the transducer assembly is configured to, while inserted into the body cavity, move in at least one dimension and generate ultrasound data; a processor system configured to generate an ultrasound image based on the ultrasound data; and a display device coupled to the ultrasound probe and configured to simultaneously display the ultrasound image and a visual representation of the transducer assembly in the at least one dimension.

Example 15 is the ultrasound system of example 14 that may optionally include that the at least one dimension includes an anteflexion/retroflexion dimension and a lateral flexion dimension.

Example 16 is the ultrasound system of example 15 that may optionally include that the visual representation includes a three-dimensional (3D) graphic.

Example 17 is the ultrasound system of example 14 that may optionally include that the transducer assembly includes a transducer array implemented to rotate about a vertical axis that is perpendicular to the transducer array, and the display device is implemented to indicate an angle of the transducer array caused by said rotate.

Example 18 is the ultrasound system of example 14 that may optionally include that the movement of the transducer assembly includes a rotation in a dimension that is perpendicular to a longitudinal axis of the mid-section.

Example 19 is the ultrasound system of example 14 that may optionally include that the ultrasound probe is implemented to enable a lock state to inhibit the movement of the transducer assembly, and the display device is implemented to display an indication that the lock state is enabled.

Example 20 is an ultrasound system comprising: an ultrasound probe including a transducer assembly having a transducer array, where the transducer assembly is configured for insertion into a body cavity, and the ultrasound probe is configured to, while the transducer assembly is inserted into the body cavity: cause the transducer assembly to move in an anteflexion/retroflexion dimension and a lateral flexion dimension; cause the transducer array to rotate about a vertical axis that is perpendicular to the transducer array; and cause the transducer assembly to rotate about a longitudinal axis of transducer assembly. The ultrasound system also includes a display device configured to display one or more visual representations indicating the movements in the anteflexion/retroflexion dimension and the lateral flexion dimension, the rotation about the vertical axis, and the rotation about the longitudinal axis.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in some embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An ultrasound system comprising:
    an ultrasound probe including a probe body and a transducer assembly coupled to the probe body, the probe body including one or more user input devices and one or more sensors configured to determine a setting of the one or more user input devices that cause a movement of the transducer assembly, wherein at least one of the one or more sensors is a position sensor;
    a processor coupled to the one or more sensors that is configured to:
    determine at least one angle of the transducer assembly resulting from the movement based on the setting of the one or more user input devices;
    determine an amount of tissue compression based on ultrasound transmitted by the transducer assembly, wherein the transducer assembly is configured to be inserted inside a body cavity;
    reset the at least one angle of the transducer assembly based on the amount of tissue compression; and
    a display device coupled to the ultrasound probe and configured to display a visual representation of the transducer assembly that indicates the at least one angle.

2. The ultrasound system as described in claim 1, wherein the at least one angle includes one of an anteflexion/retroflexion angle and a lateral flexion angle.

3. The ultrasound system as described in claim 2, wherein the at least one angle includes the other of the anteflexion/retroflexion angle and the lateral flexion angle.

4. The ultrasound system as described in claim 3, wherein the visual representation includes a three-dimensional (3D) graphic.

5. The ultrasound system as described in claim 1, further comprising a cable coupled to the ultrasound probe and the display device, wherein the at least one angle includes an angle of rotation of the transducer assembly about a longitudinal axis of the cable.

6. The ultrasound system as described in claim 1, wherein the transducer assembly includes a transducer array, and the at least one angle includes an angle of rotation of the transducer array about a vertical axis that is perpendicular to the transducer array.

7. The ultrasound system as described in claim 1, wherein the visual representation includes a number to indicate an angle of the at least one angle.

8. The ultrasound system as described in claim 1, wherein the one or more sensors include at least one of a Hall effect sensor, a resistive sensor, a capacitive sensor, a rotary sensor, and a linear sensor.

9. The ultrasound system as described in claim 1, wherein the one or more user input devices include at least one of a knob, a button, a wheel, a stick, and a slider.

10. The ultrasound system as described in claim 1, wherein the processor is further configured to:
    issue a warning against moving the ultrasound probe based on the amount of tissue compression.

11. The ultrasound system as described in claim 10, wherein the warning includes at least one of a haptic feedback on the ultrasound probe and a display of a warning indicator on the display device.

12. The ultrasound system as described in claim 1, wherein at least one of the ultrasound probe and the display device includes a control input that when enabled prevents the movement of the transducer assembly.

13. The ultrasound system as described in claim 12, wherein the display device is configured to change the display of the visual representation responsive to the control input being enabled.

14. A method for an ultrasound system comprising
    an ultrasound probe including a probe body and a transducer assembly coupled to the probe body, the probe body including one or more user input devices and one or more sensors coupled to the one or more input devices, wherein at least one of the one or more sensors is a position sensor, the method comprising:

determining, using the one or more sensors, a setting of the one or more user input devices that cause a movement of the transducer assembly, wherein the transducer assembly is configured to be inserted inside a body cavity;

determining, using a processor coupled to the one or more sensors, at least one angle of the transducer assembly resulting from the movement based on the setting of the one or more user input devices;

determining an amount of tissue compression based on ultrasound transmitted by the transducer assembly;

resetting the at least one angle of the transducer assembly based on the amount of tissue compression; and displaying, using the processor, a visual representation of the transducer assembly that indicates the at least one angle on a display device.

15. The method as described in claim 14, wherein the at least one angle includes one of an anteflexion/retroflexion angle, a lateral flexion angle, an angle of rotation of the transducer assembly about a longitudinal axis of a cable coupled to the ultrasound probe, or an angle of rotation about a vertical axis that is perpendicular to a transducer array of the transducer assembly.

16. The method as described in claim 14, wherein the visual representation includes at least one of a three-dimensional (3D) graphic or a number to indicate an angle of the at least one angle.

17. The method as described in claim 14, wherein the transducer assembly includes a transducer array, and the at least one angle includes.

18. The method as described in claim 14, wherein the one or more sensors include at least one of a Hall effect sensor, a resistive sensor, a capacitive sensor, a rotary sensor, and a linear sensor.

19. The method as described in claim 14, further comprising:

issuing, using the processor, a warning against moving the ultrasound probe based on the amount of tissue compression.

20. The method as described in claim 14, further comprising:

preventing, using the processor, the movement of the transducer assembly.

\* \* \* \* \*